United States Patent
Utesch et al.

(10) Patent No.: US 8,597,447 B2
(45) Date of Patent: Dec. 3, 2013

(54) ADHESIVE TAPE, PARTICULARLY FOR BONDING PHOTOVOLTAIC MODULES

(75) Inventors: Nils Utesch, Hamburg (DE); Axel Burmeister, Buchholz (DE); Franziska Czerwonatis, Hamburg (DE)

(73) Assignee: tesa SE, Hamburg (DE)

( * ) Notice: Subject to any disclaimer, the term of this patent is extended or adjusted under 35 U.S.C. 154(b) by 344 days.

(21) Appl. No.: 12/615,631

(22) Filed: Nov. 10, 2009

(65) Prior Publication Data

US 2010/0147443 A1 Jun. 17, 2010

(30) Foreign Application Priority Data

Dec. 16, 2008 (DE) .................. 10 2008 062 128
Mar. 4, 2009 (DE) .................. 10 2009 011 163

(51) Int. Cl.
*B29C 44/06* (2006.01)
*B29C 44/18* (2006.01)
*H01L 31/048* (2006.01)

(52) U.S. Cl.
USPC .............. 156/79; 156/107; 156/293; 136/251

(58) Field of Classification Search
USPC ................... 156/79, 107, 293; 136/251, 259
See application file for complete search history.

(56) References Cited

U.S. PATENT DOCUMENTS

| | | | |
|---|---|---|---|
| 3,615,972 A * | 10/1971 | Morehouse et al. | ............ 156/79 |
| 3,740,366 A | 6/1973 | Sanderson et al. | |
| 3,770,780 A | 11/1973 | Hirsch | |
| 3,790,553 A | 2/1974 | Rao et al. | |
| 3,900,610 A | 8/1975 | McKenna, Jr. | |
| 4,277,387 A | 7/1981 | Jordan, Jr. et al. | |
| 4,320,076 A * | 3/1982 | Greenwood | ..................... 264/35 |
| 4,555,284 A | 11/1985 | Quella et al. | |
| 4,828,881 A * | 5/1989 | Brown et al. | ................. 427/208 |
| 5,225,450 A | 7/1993 | Beukers | |
| 5,234,757 A | 8/1993 | Wong | |
| 5,478,402 A * | 12/1995 | Hanoka | ......................... 136/251 |
| 5,733,382 A * | 3/1998 | Hanoka | ......................... 136/251 |
| 6,103,152 A * | 8/2000 | Gehlsen et al. | ............. 264/45.4 |
| 2007/0129527 A1 | 6/2007 | Griswold | |
| 2008/0099944 A1 | 5/2008 | Lipprandt et al. | |
| 2008/0236575 A1 | 10/2008 | Chuda | |
| 2010/0000604 A1* | 1/2010 | Moineau et al. | .............. 136/259 |

FOREIGN PATENT DOCUMENTS

| | | |
|---|---|---|
| DE | 32 11 067 A1 | 9/1983 |
| DE | 3 809 167 A1 | 9/1989 |
| DE | E 65 793 B | 12/1989 |
| DE | 43 13008 C1 | 11/1994 |
| DE | 692 20 841 T2 | 2/1998 |
| DE | 699 20 281 T2 | 1/2005 |
| DE | 10 2004 037 910 A1 | 3/2006 |
| DE | 10 2006 038322 A1 | 2/2008 |
| DE | 10 2007 053 432 A1 | 5/2009 |
| EP | 0 006 571 A1 | 1/1980 |
| EP | 0 345 855 A1 | 12/1989 |
| EP | 0 578 151 A1 | 1/1994 |
| WO | 2006/118766 A1 | 11/2006 |

* cited by examiner

*Primary Examiner* — Michael Tolin
(74) *Attorney, Agent, or Firm* — Norris McLaughlin & Marcus PA

(57) ABSTRACT

The present invention relates to the use of an adhesive tape for adhesively bonding photovoltaic modules, more particularly for adhesively bonding a PV laminate in the frame of a PV module, where the adhesive tape has at least one adhesive layer and where there is at least one polymer layer comprising a foaming agent.

13 Claims, 2 Drawing Sheets

ADHESIVE TAPE, PARTICULARLY FOR BONDING PHOTOVOLTAIC MODULES

The invention relates to the use of an adhesive tape for adhesively bonding photovoltaic modules and also to a suitable method of adhesively bonding photovoltaic modules.

BACKGROUND OF THE INVENTION

Photovoltaic modules (PV modules) are particular optoelectronic components. Photovoltaics (PV) is the direct conversion of radiant energy, principally the energy of the sun, into electrical energy with the aid of solar cells. There are various embodiments of solar cells, the most widespread being thick-layer silicon cells, either as monocrystalline cells (c-Si) or multicrystalline cells (mc-Si). Increasingly widespread are thin-film cells made of amorphous silicon (a-Si), GaAs (gallium arsenide), CdTe (cadmium telluride), CIS (copper, indium, selenium), CIGS (copper, indium, gallium, selenium), and also organic solar cells and dye cells.

For the purpose of obtaining energy, solar cells are usually connected to form large solar modules, known as PV modules. For this purpose the cells are connected in series with conductor tracks on the front and rear. This results in addition of the voltage of the individual cells. Moreover, the solar cells are typically processed as a laminate, that is, in particular, provided on the top and bottom sides with a barrier material (glass, films, etc.).

The manufacture of a solar module is frequently accomplished with the optically active side downwards. Generally a corresponding glass is cleaned and placed ready. The glass is typically a low-iron, tempered white glass in a thickness of 3 to 4 mm, with very low absorption between 350 nm and 1150 nm. Atop this glass then comes a cut-to-size sheet of ethylene-vinyl acetate film (EVA film). The solar cells are joined by means of solder ribbons to form individual strands (called strings) and positioned on the top side of this EVA film. Then the interconnects which are intended to connect the individual strings to one another and which lead to the site of the connection socket are positioned and soldered. Subsequently the whole is covered in succession with cut-to-size EVA films and polyvinyl fluoride films (e.g. Tedlar™) or with an assembly of EVA, polyester and polyvinyl fluoride. The next step in production is the laminating of the module under a reduced pressure of around 20 mbar and at around 150° C. At the laminating stage, the EVA film, which up to that point has been milky, turns into a clear, three-dimensionally crosslinked plastic layer that can no longer be melted, and the solar cells are embedded in this layer, and the layer is firmly connected to the glass screen and the back-side film. Following lamination, the edges are trimmed, the connection socket is fitted, and the laminate is populated with freewheeling diodes. The laminate is thus complete.

PV modules are provided, for reasons of stability, with a frame, more particularly an aluminium frame, which serves both for assembly and for protection of the PV modules from fracture as a consequence of excessive bending. The connection between frame and laminate, which typically comprises the glass, polymer films, back-side film and solar cells, is solved, for example, through the application of a double-sided foam adhesive tape. This tape is bonded typically to the laminate edge and optionally is also wrapped round on to the bottom and/or top sides of the laminate, where it is pressed down. The laminate thus equipped is then pressed with a very high force into the frame groove. The sensitive laminate, as already described above, is generally protected on its top side, i.e. the optically active side, by a glass layer against water vapour or water, and on the bottom side either by a second glass layer or by a film or film composite with barrier effect. The laminate edges, in contrast, are protected only by the foam adhesive tape against the ingress of water. As the PV modules grow in size, particularly in the case of tracker modules, i.e. modules which use motors to track the position of the sun, an ever greater force is required to press the laminates into the frames. Pressing is particularly critical at the edges of the laminate, since, in the case of wrapping or overlapping there is a double thickness of adhesive tape here. When the module is being pressed in, therefore, the adhesive tape may be damaged, possibly producing cracks in the foam, through which, in turn, rainwater may penetrate to the laminate edge and, by corrosion of the solder connections of the cell connectors, or by getting in beneath the glass/EVA boundary layer, may disrupt or even destroy the sensitive laminates. The operation of enframing using a double-sided foam adhesive tape proves to be very time-consuming and difficult to automate.

Alternatively the connection between frame and laminate may be realized by the introduction of crosslinkable liquid silicone or a liquid adhesive into the frame groove. This in turn has the disadvantage that the swelling silicone or the liquid adhesive requires laborious removal.

The present invention therefore addresses the problem of simplifying the assembly of a photovoltaic module, more particularly by mechanical application of the adhesive and/or by the introduction of the laminate into the PV frame at only low pressure. A further intention is that defects in the connection of frame and laminate, not least in the region of the frame corners, should be avoided.

An adhesive tape is proposed which is easy to apply and which simplifies frame assembly and which, furthermore, ensures a degree of protection of the laminate edge against water/water vapour penetration that is similar to that provided by the laborious sealing with crosslinkable liquid silicone.

SUMMARY OF THE INVENTION

A finding of particular significance for the invention is that it is not necessary to have recourse to liquid adhesive, more particularly liquid silicone adhesive, for the bonding of laminate and frame, in order to avoid a relatively high pressure when assembling. Instead it is also possible to use an adhesive tape, provided this tape is correctly designed. The problem associated with the use of a conventional adhesive tape is that the thickness of the adhesive tape and the thickness of the laminate must together fill the frame to such an extent that the adhesive tape has contact over its full area with the laminate on one side and with the frame on the other. In order to ensure that this is the case, the solution to date has been to use the layer of foam, which affords a certain flexibility.

Presently it has now been recognized that the clear width of the frame need not be fully filled at the point when the laminate is inserted into the frame. Instead it is sufficient for the clear width to be subsequently filled out in such a way that the adhesive tape is in full-area contact with both the frame and the laminate. It has now been realized that this can be accomplished through the use of an adhesive tape, more particularly an adhesive silicone tape, which comprises at least one foamable layer. Subsequently, then, as a result of the foaming, the thickness of the adhesive tape is increased and the frame is filled out completely by adhesive tape and laminate.

To a person skilled in the art it is surprising here that the strength of the connection between frame and laminate matches or even exceeds that of bonding with a conventional foam adhesive tape, despite the reduced force with which the laminate is pressed into the frame.

An adhesive tape of this kind has the advantage, moreover, that it is easy itself to apply and that there is no need for the otherwise high pressure for the insertion of the laminate.

DETAILED DESCRIPTION

The possibility of the foaming of the adhesive tape is obtained through the incorporation of a foaming agent into a polymer layer of the adhesive tape. This polymer layer may be an existing layer or an additional layer of the adhesive tape. More particularly, however, it is in this case an adhesive layer. An adhesive tape for the present purposes is a planar adhesive article, hence also an adhesive article with restricted dimensions, such as a diecut, for example. An adhesive tape is more particularly also a structure composed solely of an adhesive layer, in other words an adhesive transfer tape. The adhesive tape may alternatively be configured as a planar structure with a carrier, a top adhesive layer and a bottom adhesive layer, and, if desired, further functional layers.

Particular preference is given to an embodiment of the adhesive tape such that the polymer layer comprising the foaming layer has a layer thickness, after foaming (and not mounted in the frame and pressed together), in the range from about 100 μm to about 3000 μm. This is usually sufficient to obtain adequate adhesive bonding of the laminate in the frame.

The adhesive tape may in principle first be applied to the laminate and then inserted with the laminate into the frame, or else inserted into the frame before the laminate.

In a preferred embodiment of the method the unfoamed adhesive tape, preferably lined with a release film or release paper, is pressed, during the production of the frame profile, into the groove intended for the laminate. More particularly this takes place during the process of extrusion of the frame profile. With further preference the frame together with the adhesive tape is subsequently separated, in particular by sawing, to the desired length. The frame thus equipped is simply pushed on to the laminate, after the removal of the release film from the adhesive tape. As a result of the low thickness of the adhesive tape, the gap between the adhesive-tape sides can be larger than the thickness of the laminate. As a result of this, the laminate can be pushed with little or no force into the groove in the aluminium profile that is equipped with adhesive tape. After the frame parts have been screwed to one another, the adhesive tape is induced to foam by means of a short temperature shock, of preferably at least 100° C., more preferably of at least 150° C., with particular preference of at least 180° C., and thus fills out the free spaces between groove and laminate completely. The frame corners are fully foamed out, and there can be no ingress of water more particularly even in the corners.

Suitable foaming agents include, in particular, microballoons, which are present in a polymer layer, more particularly an adhesive layer. (Self-)adhesives foamed by means of microballoons have for a long time been known and described (DE 10 2004 037 910 A1). They feature a defined cell structure with a uniform size distribution of the foam cells. These are closed-cell microfoams without cavities, thus making it possible, in comparison to open-cell versions, to obtain better sealing of sensitive products towards dust and liquid media.

Microballoons are, in particular, elastic hollow spheres which have a thermoplastic polymer shell. These spheres are filled with low-boiling liquids or liquefied gas. Shell materials used are, in particular, polyacrylonitrile, PVDC, PVC or polyacrylates. Particularly suitable low-boiling liquids are hydrocarbons of the lower alkanes, isobutane or isopentane for example, which are enclosed in the form of liquefied gas under pressure in the polymer shell. Action on the microballoons, particularly the action of heat, has the effect of softening the outer polymer shell. At the same time the liquid propellant gas located in the shell undergoes conversion to its gaseous state. In this process, the microballoons expand irreversibly and three-dimensionally. Expansion comes to an end when the internal pressure equals the external pressure. Since the polymeric shell remains intact, a closed-cell foam is obtained in this way.

By virtue of their flexible, thermoplastic polymer shell, foams of this kind possess a greater conformability than those filled with non-expandable, non-polymeric, hollow microbeads (such as hollow glass beads, for example). Furthermore, foams of this kind are better capable of compensating manufacturing tolerances, of the kind which are the rule, for example, in the case of injection mouldings, and the foams, by virtue of their foam character, are also better able to compensate thermal stresses and also shock and vibrations.

Moreover, through the selection of the thermoplastic resin of the polymer shell, it is possible to exert further influence on the mechanical properties of the foam. Thus, for example, it is possible—even when the foam is less dense than the matrix— to produce foams having a higher cohesive strength than with the polymer matrix alone. For instance, typical foam properties such as the conformability to rough substrates can be combined with a high cohesive strength for PSA foams.

Conventionally chemically or physically foamed materials, in contrast, are more susceptible to irreversible collapse under pressure and temperature. The cohesive strength is lower there as well.

A large number of types of microballoon are available commercially, such as, for example, from Akzo Nobel the Expancel DU (dry unexpanded) types, which differ essentially in their size (6 μm to 45 μm in diameter in the unexpanded state) and in the initial temperature they require for expansion (75° C. to 220° C.). When the type of microballoon and/or the foaming temperature have been matched to the machine parameters and to the temperature profile needed for compounding of the composition, compounding of the composition and coating may be carried out such that the microballoons do not foam in the course of processing and obtain their entire expansion potential for the application.

Furthermore, unexpanded types of microballoon are also obtainable in the form of an aqueous dispersion having a solids fraction or microballoon fraction of about 40% to 45% by weight, and additionally in the form of polymer-bound microballoons (masterbatches), for example in ethylene-vinyl acetate with a microballoon concentration of about 65% by weight. Not only the microballoon dispersions but also the masterbatches, like the DU types, are particularly suitable for the foaming of adhesives.

All kinds of adhesives, especially pressure-sensitive adhesives (PSAs), are suitable in principle for application in solar modules which are suitable for outdoor use and which withstand the intended environmental conditions. Adhesives based on acrylates and also adhesives based on the majority of synthetic rubbers have emerged as being particularly suitable. Furthermore, adhesives based on poly(diorgano)siloxanes (silicones) and also moisture-crosslinking, silylated, pressure-sensitive polyurethane (PU) adhesives have emerged as being particularly suitable.

Suitability as PSA for the outer layers is possessed, for example, by PSAs based on polyisobutylene, butyl rubber, hydrogenated styrene block copolymers, special polyolefins, and acrylate polymers applied from solution and as hotmelts.

The PSA can be crosslinked by chemical crosslinking and/or by electronic and/or UV irradiation.

In one particular embodiment the adhesive of the adhesive layers is based on polyisobutylene as a base polymer. In order to give the adhesive the necessary tack it is mixed with resins. An elastomeric constituent used is preferably a mixture of a medium-molecular-weight polyisobutylene, preferably having a molecular weight in the range of 20 000 to 60 000, with a higher-molecular-weight polyisobutylene, preferably having a molecular weight of more than 1 500 000, more preferably more than 2 000 000. As the version with the highest shear strength to date it has proved to be appropriate to take, as the polyisobutylene component of medium molecular weight, a grade having an average molecular weight of 40 000, which is freely available commercially under the grade designation "Oppanol B10" from BASF, and, as a polyisobutylene component of high molecular weight, a grade having an average molecular weight of 2 600 000, which is available likewise freely under the grade designation "Oppanol B150". Products from the "Vistanex" family from Exxon are considered likely to be similarly suitable. Resins used are rosins and/or polyterpene resins and/or other hydrocarbon resins.

As PSAs it is preferred to use those based on block copolymers containing polymer blocks formed from vinylaromatics (A blocks), such as, for example, styrene, and those formed by polymerization of 1,3-dienes (B blocks), such as, for example, butadiene and isoprene or a copolymer of the two. Mixtures of different block copolymers can also be employed. The block copolymers may be partly or fully hydrogenated. Moreover, the block copolymers may have a linear A-B-A structure. It is likewise possible to use block copolymers of radial architecture, and also star-shaped and linear multi-block copolymers. A-B diblock copolymers are used as a further component, the fraction of diblock copolymers as a proportion of the overall elastomer content being at least 50%. It is preferred to use those block copolymers which possess a polystyrene content of more than 20%.

Typical use concentrations for the block copolymer lie at a concentration in the range between 30% and 70% by weight, more particularly in the range between 35% and 55% by weight.

Tackifiers used are preferably tackifier resins which are compatible with the elastomer block of the styrene block copolymers. Suitable tackifier resins are preferably unhydrogenated, partially hydrogenated or fully hydrogenated resins based on rosin or rosin derivatives, or hydrogenated polymers of dicyclopentadiene, or unhydrogenated, partially hydrogenated, selectively hydrogenated or fully hydrogenated hydrocarbon resins based on C-5, C-5/C-9 or C-9 monomer streams, or, with particular preference, polyterpene resins based on α-pinene and/or β-pinene and/or δ-limonene. Aforementioned tackifier resins can be used both alone and in a mixture.

Further additives which can typically be utilized are as follows:
- primary antioxidants such as, for example, sterically hindered phenols
- secondary antioxidants such as, for example, phosphites or thioethers
- in-process stabilizers such as C-radical scavengers, for example
- light stabilizers such as, for example UV absorbers or sterically hindered amines
- processing assistants
- endblock reinforcer resins and
- if desired, further polymers, preferably elastomeric in nature; elastomers which can be utilized accordingly include, among others, those based on pure hydrocarbons, examples being unsaturated polydienes such as natural or synthetic polyisoprene or polybutadiene, elastomers with substantial chemical saturation, such as, for example, saturated ethylene-propylene copolymers, α-olefin copolymers, polyisobutylene, butyl rubber, ethylene-propylene rubber, and chemically functionalized hydrocarbons such as, for example, halogen-containing, acrylate-containing or vinyl ether-containing polyolefins, to name but a few.

In a further preferred embodiment the polymer layer is composed of an acrylate. Acrylates feature high ageing stability, very high bonding values and low absorption. Preferably the adhesive is based on acrylate polymers or polyethylene-vinyl acetate polymers.

Acrylate dispersions are known and are used both for adhesive-tape adhesives and for label adhesives in large quantities. The acrylate dispersions comprise particles of acrylate polymers which are in disperse distribution in the aqueous phase of the dispersion. Acrylate dispersions are prepared customarily in an aqueous medium by polymerization of suitable monomers. The preparation process may involve either a batch operation or else the metered addition of one or more components during the polymerization. In the case of the batch operation, all of the necessary components are included at the same time in the initial charge.

The properties of the acrylate dispersions and of the corresponding adhesives are determined primarily by the selection of the monomers and the molecular weight attained. The major monomers are n-butyl acrylate, 2-ethylhexyl acrylate and acrylic acid. Suitable monomer units are described in "Acrylic Adhesives", Donatas Satas in Handbook of Pressure Sensitive Adhesive Technology, Second Edition, edited by Donatas Satas, Van Nostrand Reinhold New York, pages 396 to 456.

Acrylate dispersions used contain in particular [in each case in % by weight]

0 to 10% acrylic acid units
0 to 100% n-butyl acrylate units
0 to 100% 2-ethylhexyl acrylate units.

In one preferred embodiment acrylate dispersions with 0.5% to 3% of acrylic acid units are used. In another preferred embodiment acrylate dispersions with 0.5% to 3% of acrylic acid units and 99.5% to 90%, more preferably 99.5% to 96%, of n-butyl acrylate units are used. A further example of acrylate dispersions of the invention are acrylate dispersions with 80% to 90% of 2-ethylhexyl acrylate units and 8 to 20% of n-butyl acrylate units.

The acrylate dispersions may additionally comprise further monomer units through which it is possible, for example, to control the glass transition temperature and the crosslinkability. Examples are methyl acrylate, ethyl acrylate, methyl ethylacrylate, maleic anhydride, acrylamide, glycidyl methacrylate, isopropyl acrylate, n-propyl acrylate, isobutyl acrylate, n-octyl acrylate, and the methacrylates corresponding to these acrylates. The acrylate dispersions customarily contain 0% to 10% by weight of these additional monomer units; either exclusively one additional monomer unit or mixtures thereof are used.

The glass transition temperature attained depends on the monomers employed. The acrylate dispersions that are used for the adhesives of the invention have, in the dried state, glass transition temperatures more particularly of between −80° C. and −15° C., preferably between −75° C. and −25° C. and more preferably between −55° C. and −35° C.

The solids content of the acrylate dispersions is more particularly between 30% and 70% by weight, preferably between 45% and 60% by weight. Examples include the acrylate dispersions Primal PS 83d and Primal PS 90 from Rohm & Haas.

If desired, the dispersion may comprise further additives. Suitable crosslinking agents may be epoxy resins, amine derivatives such as, for example, hexamethoxymethylmelamine and/or condensation products of an amine, for example melamine, or urea with an aldehyde, for example formaldehyde. In order to obtain non-sticky polyacrylate dispersions it has been found that it is advantageous, where appropriate, to add further compounds which react, for example, with the carboxyl groups of the polymer. Examples of such are aziridines, such as ethylenimine and propylenimine.

The adhesives used in producing the adhesive tapes may comprise further components. Examples are resins, plasticizers, dyes, defoamers and thickeners, and also further adjuvants for setting the desired rheological behaviour. Modifications of acrylate dispersions are known and are described for example in "Modification of Acrylic Dispersions", Alexander Zettl in Handbook of Pressure Sensitive Adhesive Technology, Second Edition edited by Donatas Satas, Van Nostrand Reinhold New York, pages 457 to 493.

Aqueous resin dispersions, i.e. dispersions of resin in water, are known. Preparation and properties are described for example in "Resin Dispersions", Anne Z. Casey in Handbook of Pressure Sensitive Adhesive Technology, Second Edition, edited by Donatas Satas, Van Nostrand Reinhold New York, pages 545 to 566. Resin dispersions of hydrocarbon resins and modified hydrocarbon resins are likewise known and are available for example from Hercules BV under the tradename Tacolyn (example: Tacolyn 4177).

Suitable resin dispersions are those based on hydrocarbon resins or modified hydrocarbon resins with a softening point of between 50° C. and 100° C. The adhesive may comprise, for example, 5% to 28% by weight of the resin dispersions. The solids content of the resin dispersions is customarily between 40% and 70%.

The adhesive may be admixed with resin dispersions based on mixtures of different hydrocarbon resins, and also on mixtures of hydrocarbon resins with other known resins. Possible, for example, are mixtures of hydrocarbon resins with small amounts of resins based on rosin or modified rosin or phenolic resins, other natural resins, resin esters or resin acids.

The adhesive may also be admixed with plasticizing components such as plasticizer resins, liquid resins, oils or other known components such as, for example, alkoxylated alkylphenols. Alkoxylated alkylphenols are known and described for example in U.S. Pat. No. 4,277,387 A and EP 0 006 571 A. The use of alkoxylated alkylphenols as plasticizers has been proposed in references including "Modification of Acrylic Dispersions", Alexander Zettl in Handbook of Pressure Sensitive Adhesive Technology, Second Edition, edited by Donatas Satas, Van Nostrand Reinhold New York, page 471.

The properties of the alkoxylated alkylphenols are determined by the alkyl radical and predominantly by the construction of the polyglycol ether chain. For the preparation it is possible to use both ethylene oxide and propylene oxide. In one particular embodiment propoxylated alkylphenol is used. Preference is given to water-insoluble alkoxylated alkylphenols. Additionally preferred are alkoxylated alkylphenols having a boiling point of greater than 100° C., preferably greater than 130° C. and more preferably greater than 200° C.

The adhesive can be optimized for greater shear strength by using crosslinkers. Selection and proportion of crosslinkers are known to the skilled person. Crosslinkers for acrylate dispersions are known in principle and described for example in "Acrylic Adhesives", Donatas Satas in Handbook of Pressure Sensitive Adhesive Technology, Second Edition, edited by Donatas Satas, Van Nostrand Reinhold New York, pages 411 to 419. Crosslinkers based on isocyanate are suitable in principle, but are not preferred—on account of the limited pot lives and the increased cost and complexity associated with workplace safety. An example of isocyanate-based crosslinkers is Basonat F DS 3425 X (BASF).

Isocyanate-free crosslinkers are preferred, examples being crosslinkers based on salts of polyfunctional metals. These crosslinkers are known in principle and are described for example in U.S. Pat. No. 3,740,366 A, U.S. Pat. No. 3,900,610 A, U.S. Pat. No. 3,770,780 A and U.S. Pat. No. 3,790,553 A. Particularly suitable crosslinkers are those based on zinc complexes which are able to form covalent and/or complex-type bonds with carboxyl groups.

As already described above, particular suitability is possessed by adhesives based on poly(diorgano)siloxanes (silicones). These adhesives hold up particularly well to the environmental influences which occur in outdoor use, and themselves already provide a barrier towards permeants.

On account of the highly stable Si—O bond, poly(diorgano)siloxanes (silicones) exhibit excellent resistance towards environmental influences such as UV light, ozone, chemicals and high temperatures, and therefore have extremely high life cycles. Furthermore, on account of the low $T_g$ of up to −120° C., silicones remain flexible and processable even at temperatures of −70° C., and, moreover, display excellent absorption properties with respect to shaking, vibration, noise and temperature effects. The apolar organic radicals (e.g. methyl or phenyl groups) of the Si—O polymer backbone result in excellent hydrophobicity on the part of the silicones, leading to an extremely low water absorption capacity.

Silicone PSAs are composed of poly(diorgano)siloxanes (e.g. PDMS: polydimethylsiloxane) and silicate resins (MQ resin). By virtue of having the same chemical nature, silicone PSAs have the same physical properties and chemical resistances as pure silicones (e.g. crosslinkable liquid silicones). Silicones are therefore suitable for areas of application involving a particularly high load from temperature fluctuations. As well as a high UV and ozone resistance they also feature, in particular, the combined functions of high temperature resistance, elasticity, and pronounced damping behaviour with respect to shock effects and vibrations. Furthermore, long-term temperature loads in the range from −75° C. to 260° C. have no adverse effect on the physical properties of silicones.

For the application of adhesive tapes, these outstanding physical properties come advantageously into play when a silicone PSA is filled with microballoons and therefore becomes foamable. Particularly advantageous is an embodiment such that the silicone PSA is crosslinked in the course of the foaming operation. It is especially advantageous, furthermore, if the silicone PSA which is foamable by means of microballoons is used in a double-sided adhesive tape whose carrier is a barrier film. In that case the second side of the barrier film is preferably likewise coated with a silicone PSA.

For the choice of suitable silicone PSAs, both condensation-crosslinking silicone PSAs and addition-crosslinking silicone PSAs are available.

Condensation-crosslinking silicone PSAs are composed at least of the following components:
  a) a hydroxy-functionalized organopolysiloxane composed of at least one diorganosiloxane unit,
  b) an organopolysiloxane resin with the formula: $(R^1{}_3SiO_{1/2})_x(SiO_{4/2})_{1.0}$, where $R^1$ is a substituted or unsubstituted monovalent hydrocarbon group, a hydrogen atom or a hydroxyl group and x is a number between 0.5 and 1.2,
c) optionally an organic solvent,
d) optionally a peroxo compound, and
e) optionally a stabilizer.

Silicone PSAs of this kind are freely available commercially.

Addition-crosslinking silicone PSAs are composed at least of the following components:
a) an organopolysiloxane which is composed of at least one diorganosiloxane unit and carries at least two silicon-bonded alkenyl groups in each molecule,
b) an organopolysiloxane resin with the formula: $(R^1_3SiO_{1/2})_x(SiO_{4/2})_{1.0}$,
where $R^1$ is a substituted or unsubstituted monovalent hydrocarbon group, a hydrogen atom or a hydroxyl group and x is a number between 0.5 and 1.2,
c) an organopolysiloxane which carries on average at least two silicon-bonded hydrogen atoms in each molecule, in an amount such that there are 0.01 to 10 mol of silicon-bonded hydrogen atoms present per mole of the total alkenyl groups of components a), b) and e), and which is free from olefinic double bonds,
d) optionally an organic solvent,
e) an organometallic catalyst from group 10 of the periodic table of the elements, and
f) optionally an inhibitor.

Silicone PSAs of this kind are freely available commercially.

As tackifiers these adhesives utilize as a main component, in particular, organopolysiloxane resins or so-called MQ resins with the formula $(R^1_3SiO_{1/2})_x(SiO_{4/2})_{1.0}$. The M unit therein is denoted by the $(R^1_3SiO_{1/2})$ units, the Q unit by the $(SiO_{4/2})$ units. Each $R^1$ independently of any other represents a monovalent saturated hydrocarbon group, a monovalent unsaturated hydrocarbon group, a monovalent halogenated hydrocarbon group, a hydrogen atom or a hydroxyl group. The ratio of M units to Q units (M:Q) is in the range from 0.5 to 1.2. The MQ resins are advantageously resins having a weight-average molecular weight $M_w$ of 500 g/mol≤$M_w$≤100 000 g/mol, preferably of 1 000 g/mol≤$M_w$≤25 000 g/mol [the figures for the average molecular weight $M_w$ in this specification relate to the determination by gel permeation chromatography]. MQ resins of this kind are freely available commercially.

It has emerged as being advantageous if adhesives are used in which the proportional ratio—based on percent by weight—of polydiorganosiloxane to MQ resin is situated in the range from 20:80 to 80:20, more preferably in the range from 30:70 through to 60:40.

The silicone PSAs may, moreover, comprise further additives. Further additives which can typically be utilized include the following:
in-process stabilizers, such as inhibitors for the platinum catalyst, for example
process accelerants such as, for example, aminoorganyls in the case of condensation-crosslinking silicone PSAs
fillers, such as, for example, silica, glass beads or hollow ceramic beads, aluminium oxides or zinc oxides, and flame retardants
plasticizers, such as, for example, liquid resins, plasticized oils or low molecular mass liquid polymers, such as, for example, low molecular mass silicone oils with molar masses <1500 g/mol (number average)
UV stabilizers and absorbers such as the Hindered Amine UV Light Stabilizers (HALS).

The solids content of the silicone PSAs is situated in particular between 50% and 100% by weight. It is preferred to use commercial solvents, more particularly saturated hydrocarbons such as special-boiling-point spirit or heptane, and high-boiling aromatics such as toluene and xylene.

The silicone PSAs can be coated from solution. For coating from solution, the PSA is dissolved in common solvents, such as toluene, benzine, etc., for example, and then coated using a coating nozzle or a doctor blade. It is also possible, however, to use all other coating techniques which allow solvent-containing coatings. If the desired application rate is not obtained (i.e. an application rate which is too low) in a first coating procedure, the high application rate desired can be produced by single or multiple laminations one on top of the other.

In order to obtain sufficient cohesion, the condensation-crosslinking silicone PSAs are compounded with peroxo initiators. It is particularly preferred for this purpose to use benzoyl peroxide (BPO) in an amount of 0.2% to 5% by weight, based on the solids fraction of the silicone adhesive. In order to obtain a reasonable balance between cohesion and adhesion, a BPO content of 0.5% to 2% by weight is chosen in particular. In the case of the solvent coating of the adhesive, a temperature of 70-90° C. is chosen to start with, for at least 2 minutes, in order for the solvents to evaporate. Thereafter a temperature of 170-180° C. is set for at least 2 minutes, in order to initiate the decomposition of peroxide and hence the crosslinking operation.

Obtaining sufficient cohesion for addition-crosslinking silicone adhesives is accomplished by means of the platinum-catalysed hydrosilylation reaction between the alkenyl-functionalized organopolysiloxanes and the corresponding SiH-functionalized organopolysiloxanes. In this case, when coating from solution, first the solvent is removed at a temperature of 70-90° C. in a residence time of at least 2 minutes. Thereafter the temperature is raised to 100-120° C. and kept constant for up to 2 minutes.

Further to the conventional modes of crosslinking of silicone PSAs by means of peroxides or transition metal catalysis, these adhesives can also be crosslinked by means of actinic radiation, especially electron beams. In this case, when coating from solution, first of all the solvent is removed at a temperature of 70-90° C. in a residence time of at least 2 minutes. This is followed by crosslinking with an electron beam dose of at least 10 kGy. This mode of crosslinking is particularly advantageous, since it allows the cohesion to be set with virtually no gradations, without adversely affecting the properties of tack and adhesion (in this regard see patent application DE 10 2007 053 432.0).

Also having proved to be particularly suitable, moreover, are moisture-crosslinking silylated polyurethane (PU) PSAs. Silylated PU PSAs are isocyanate-free and are crosslinked via highly stable Si—O—Si bonds. On the basis of this stable network, silylated polyurethane adhesives feature chemical resistance towards solvents, water, acid and alkalis. The weathering resistance with respect to atmospheric moisture, ozone and UV light is correspondingly high. The resistant Si—O—Si network additionally guarantees high thermal load-bearing capacity and shear resistance.

Siliylated polyurethane adhesives are prepared typically in a 2-stage operation. A high molecular weight urethane prepolymer is generated by a reaction of selected difunctional or polyfunctional isocyanates (NCO) with selected polyols (OH). Depending on the original NCO/OH ratio >1 or <1, this prepolymer may be either isocyanate- or hydroxy-terminated. Depending on the prepolymer selected and on its termination, it is reacted with either an amino-functional or an isocyanato-functional trialkoxysilane. Solvents used are preferably esters or ketones, in order to maximize the molar mass of the silylated polyurethane compositions. Since water is the key factor in the crosslinking of these adhesives, a solvent having a sufficient water-solubility ought preferably to be chosen not only for the preparation of the silylated polyurethane adhesive but also for its crosslinking. Crosslinking proceeds in a 2-stage operation. First of all the alkoxylated silanes (Si—OR) undergo hydrolysis to form silanols (Si—OH), which subsequently undergo a condensation reaction, with the formation of stable Si—O—Si bonds. Catalysts known from polyurethane chemistry additionally accelerate this reaction.

In order to obtain the necessary adhesive technical properties, resins are added to the formulations described. More particularly, so-called MQ resins are added with the formula $(R^1_3SiO_{1/2})_x(SiO_{4/2})_1$. The M unit therein is identified by the $(R^1_3SiO_{1/2})$ units, the Q unit by the $(SiO_{4/2})$ units. Alternatively to the MQ resins it is possible to use conventional resins known in the adhesives industry, such as terpene, terpene-phenolic, coumarene, indene or hydrocarbon resins, for increasing the adhesion.

Suitable PU adhesives are based more particularly on the following components:
a) a urethane polymer, generated from di- or polyfunctional isocyanates (NCO) and di- or polyfunctional alcohols (OH), the NCO/OH ratio being either <1 or >1, which is functionalized with at least one $Si(OR)_{3-x}$ group, where R is an alkyl or acyl radical and x is the number zero or one,
b) an organometallic catalyst from main group 4 or 5,
c) a catalytic amount of water,
d) an organopolysiloxane resin with the formula: $(R^1_3SiO_{1/2})_y(SiO_{4/2})_1$,
where $R^1$ is a substituted or unsubstituted monovalent hydrocarbon group, a hydrogen atom or a hydroxyl group and y is a number between 0.5 and 1.2, and
e) optionally further additives or fillers.

In order to obtain the necessary adhesive technical properties, the formulations described are likewise admixed with MQ resins with the formula $(R^1_3SiO_{1/2})_x(SiO_{4/2})_1$. The MQ resins are advantageously resins having a weight-average molecular weight $M_w$ of 500 g/mol≤$M_w$≤100 000 g/mol, preferably of 1000 g/mol≤$M_w$≤25 000 g/mol, the figures for the average molecular weight $M_w$ in this specification relating to the determination by gel permeation chromatography (see experimental section).

It has emerged as being advantageous if adhesives are used in which the proportional ratio—based on percent by weight of silylated PU adhesive to MQ resin is situated in the range from 10:90 to 90:10, preferably in the range from 40:60 through to 90:10.

A further advantageous PU adhesive formulation is based on the following components:
a) a urethane polymer, generated from di- or polyfunctional isocyanates (NCO) and di- or polyfunctional alcohols (OH), the NCO/OH ratio being either <1 or >1, which is functionalized with at least one $Si(OR)_{3-x}$ group, where R is an alkyl or acyl radical and x is the number zero or one,
b) an organometallic catalyst from main group 4 or 5,
c) a catalytic amount of water,
d) a tackifying resin based on terpenes, terpene-phenols, coumarenes, indenes or hydrocarbons, and
e) optionally further additives or fillers.

In this case it is advantageous to use the resins known in the adhesives industry, such as terpene, terpene-phenolic, coumarene, indene or hydrocarbon resins, for increasing the adhesion. Particularly advantageous is the use of resins which have a softening range of 80 to 150° C. Examples that may be mentioned at this point include the following: KE-311 Arakawa Technical Industries, and Kristalex F85, Kristalex F 100 and Kristalex 115 from Eastman Chemical Company.

Further Blending Components

Further additives which can be utilized typically include the following:
primary antioxidants, such as sterically hindered phenols, for example
secondary antioxidants, such as phosphites or thioethers, for example
in-process stabilizers, such as C-radical scavengers, for example
light stabilizers, such as UV absorbers or sterically hindered amines, for example
processing aids
fillers, such as silicon dioxide, glass (ground or in the form of beads), aluminium oxides or zinc oxides, for example, the fillers being ground to a size at which they are not visible
plasticizers, such as, for example, liquid resins, plasticiser oils or low molecular mass liquid polymers, such as, for example, low molecular mass polybutenes with molar masses <1500 g/mol (number average).

For the application of adhesive tapes, these outstanding physical properties come advantageously into play when a silylated PU adhesive is filled with microballoons and therefore becomes foamable. It is especially advantageous, furthermore, if the silylated PU adhesive which is foamable by means of microballoons is used in a double-sided adhesive tape whose carrier is a barrier film. In that case the second side of the barrier film is likewise coated with a silylated PU adhesive. PSAs based on silylated PUs are freely available commercially; the prior art is documented in specifications including the following: US 2007129527 A1; US 20080058492 A1; WO 2006118766 A1.

Another adhesive which has proved to be suitable is one based on acrylate hotmelt with a K value of at least 20, more particularly greater than 30, which is obtainable by concentrating a solution of such an adhesive to give a system which can be processed as a hotmelt. Concentration may take place in appropriately equipped tanks or extruders; particularly in the context of accompanying degassing, a degassing extruder is preferred. One such adhesive is set out in DE 43 13 008 A1, whose disclosure content is hereby incorporated by reference. In an intermediate step, the solvent is removed completely from these acrylate compositions prepared in this way. Additionally, in the course of this procedure, further volatile constituents are removed. After coating from the melt, these compositions have only small fractions of volatile constituents. Hence it is possible to adopt all of the monomers/formulas that are claimed in the patent referenced. A further advantage of the compositions described is seen as being that they have a high K value and hence a high molecular weight. The skilled person is aware that systems with higher molecular weights can be crosslinked more efficiently. There is a corresponding reduction in the fraction of volatile constituents.

The solution of the composition may contain 5% to 80% by weight, more particularly 30% to 70% by weight, of solvent. It is preferred to use commercial solvents, especially low-boiling hydrocarbons, ketones, alcohols and/or esters.

With further preference use is made of single-screw, twin-screw or multiscrew extruders with one or, in particular, two or more degassing units.

Copolymerized in the acrylate hotmelt-based adhesive there may also be benzoin derivatives, examples being benzoin acrylate or benzoin methacrylate, acrylic esters or methacrylic esters. Benzoin derivatives of this kind are described in EP 0 578 151 A1. Alternatively the acrylate hotmelt-based adhesive may be chemically crosslinked.

In one particularly preferred embodiment, self-adhesive compositions used are copolymers of (meth)acrylic acid and the esters thereof having 1 to 25 C atoms, maleic, fumaric and/or itaconic acid and/or their esters, substituted (meth) acrylamides, maleic anhydride, and other vinyl compounds, such as vinyl esters, especially vinyl acetate, vinyl alcohols and/or vinyl ethers. The residual solvent content ought to be below 1% by weight.

For particularly sensitive solar cells, by way of example organic, CIGS or CIS solar cells, which on exposure to water vapour exhibit a tendency towards increased degradation and/or delamination, a particularly suitable adhesive tape construction is one with a barrier film between the microballoon-containing adhesive and an additional layer of adhesive without microballoons.

The barrier film used is distinguished by a low level of water vapour permeation, in order to be able to protect the sensitive laminate edge. Permeation is understood as the process in which a substance (permeate) penetrates or migrates through a solid. The driving force is a concentration gradient. Permeability is tested by a permeation measurement. The barrier film ought in particular to have a water vapour transmission rate of less than 200 g/m$^2$d at 37.8° C. and 90% RH. Particular preference is given to a barrier film having a water vapour transmission rate of less than 5, preferably less than 0.1 and more preferably less than 0.01 g/m$^2$.d, measured at 37.8° C. and 90% relative humidity (d=day=24 h).

Permeation Measurement by Flushing Gas Method

In an appropriate measuring cell for pipes, films and membranes, these can be examined for their permeability not only to any desired gases but also to liquids of all kinds. The measurements techniques for gases all include a central module which is divided by the membrane under test: on the feed side, the measuring cell is overflowed with the test gas, and the retentate which remains is taken off. The amount of gas arriving on the other side (permeate) is passed by the flushing gas to a detector, where the concentration is measured. Top and bottom parts of the cell surround the centred membrane. An O-ring which lies on the sample seals the interface. This kind of cell is usually manufactured from metal, such as stainless steel, for example.

As the barrier film it is preferred to use a polyester film. Also exhibiting outstanding properties, as well as polyester films, are films made, for example, of PUR, PP, PE, PVC, PVDC, PEN, PAN, EVOH and PA, and PA with nanocomposites. PA with nanocomposites is a PA filled with phyllosilicate. These particles have a platelet-like structure similar to that of talc. In contrast to talc, the particle size is much smaller (nanometer range). In the course of extrusion, these particles are oriented and form a layer structure. The particles themselves, like glass, are completely impervious to gases. On passing through the film, the gases are hindered, thus producing the enhanced barrier effect. The layer structure forms a kind of labyrinth through which the gases and aromas have to pass. Because of the small particle size, the optical properties of the film are unaffected. The adhesive tape ought to have a water vapour transmission rate of less than 12 g/m$^2$d at 37.8° C. and 90% rh/(d . . . day: 24 h).

Barrier films with a thickness of 0.5 µm to 160 µm, preferably 2 µm to 120 µm, are used with preference in order to obtain a sufficient permeation effect while not too greatly increasing the stiffness of the adhesive tape.

In a further advantageous embodiment, the barrier film is designed as a laminate of polymeric films, and preferably of a polyester film and of a polyolefin film, and, with further preference, the polyolefin film is provided with a metallic layer.

Suitable films are those comprising one film part which is formed by at least one polymeric film of polyester in particular, and one metallic part which is applied to the film part and is formed from a metallic layer, more particularly of aluminium. The bottom adhesive layer is applied preferably to the exposed side of the metallic layer.

The metallic layer here acts as a barrier layer, hence keeping corrosion-promoting substances such as water, water vapour, oxygen, sulphur dioxide and carbon dioxide away from the material to be protected, in other words, in particular, from the planar functional layers.

In a first advantageous embodiment of the invention the metallic layer has a thickness of 10 nm to 50 µm, more particularly 20 nm to 25 µm.

Application of the metallic layer to the film part is accomplished, for example, by vapour coating, in other words by generating a coating on the polymeric film by means of thermal evaporation under vacuum (purely thermally, electrically with electron beams, by cathodic sputtering or wire explosion, if desired with the aid of laser beams).

The barrier film is adhesively bonded preferably with binders (laminating resins) such as epoxy resins, melamine resins, thermoplastics, etc.

A particularly preferred barrier film used is a polyester film, in particular with a thickness in the 4 µm to 40 µm range, or a polyolefin film, in particular with a thickness of 20 µm to 120 µm. Combinations of these films can be used as well.

It is also possible, furthermore, to employ laminates with three or more layers. Moreover, symmetrical laminate structures around a core of a metal layer may be advantageous in particular fields of application.

It is advantageous, moreover, for there to be a second film part between metallic layer and adhesive. In this case the two film parts are preferably composed of identical polymeric films, and with further preference the second film part is likewise a laminate of a polyester film and of a polyolefin film, and again, in particular, the polyolefin film is on the metallic layer.

BRIEF DESCRIPTION OF THE DRAWINGS

Further details, objectives, features and advantages of the invention will be elucidated in more detail below, with reference to an example. In the drawing

COMPARATIVE EXAMPLE

Figure 1:
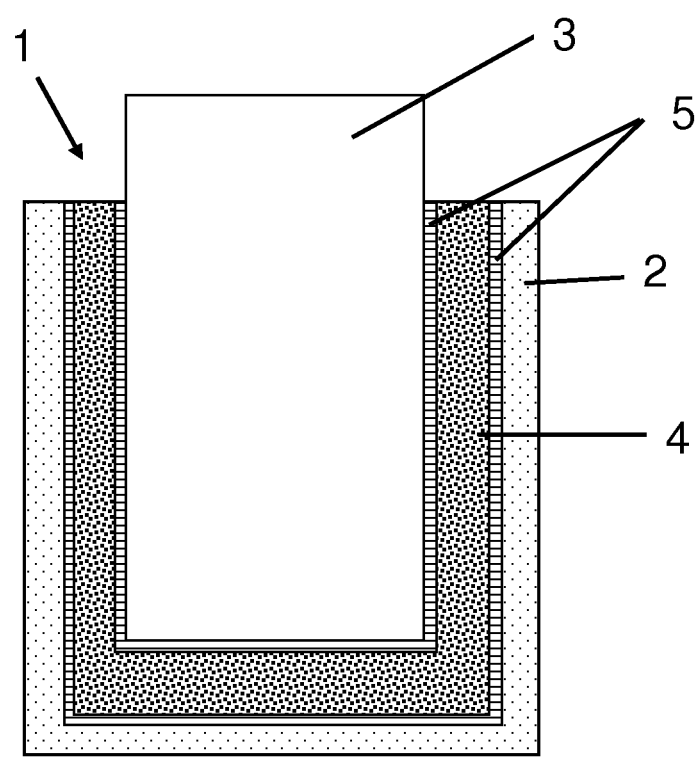
FIG. 1 shows a diagrammatic representation of a conventional foam adhesive tape in a PV module.

FIG. 1 shows a double-sided foam adhesive tape 1 which is arranged in the frame 2 of a PV module and which fixes the PV laminate 3. The frame 2 is made of aluminium 2 mm thick and has a U-shaped profile with a groove of 6 mm and a depth of 10 mm. The laminate 3 is provided on the edge and on the top and bottom sides with a double-sided foam adhesive tape 1, having a thickness of 1100 μm (tesa 4957). The foam adhesive tape 1 here has a foam layer 4 and also two adhesive layers 5.

The laminate 3, consisting of 3.2 mm glass, 2 plies of 460 μm EVA films (Etimex Vistasolar FC 486.10) and a back-side film, comprising a front side and a reverse side, made of Tedlar® and a polyester film as core with a thickness of 170 μm (Isovolta, Icosolar WW 249L), was produced using a laminator from Meyer as follows:
1) 2.5 minutes at 40° C., evacuation to 20 mbar
2) base temperature is raised within 3.5 minutes from 40° C. to 133° C., and at the same time the top laminate surface is pressed on to the module until 780 mbar have been reached
3) when 780 mbar have been reached, crosslinking takes place for 13 minutes at 133° C. and 780 mbar
4) the laminate is cooled to 40° C. for approximately 7 minutes.

The laminate 3 after lamination had a total thickness of 5 mm, and after being furnished with the double-sided adhesive tape 1 it had a total thickness of 7.2 mm.

The laminate 3 equipped with adhesive tape 1 was subsequently pressed at a speed of 50 mm/min into the frame 2. The force required for this operation was approximately 20 N/cm.

The bond strength was determined after a storage time of 24 h at 23° C. and 50% rh, by clamping the top laminate edge and the enframed bottom laminate edge. The top laminate edge was pulled upwards with a speed of 300 mm/min. In the course of this procedure, the force needed in order to pull the laminate 3 from the frame 2 was ascertained. The tensile force ascertained in this way was approximately 42 N/cm.

Example 1

Figure 2:
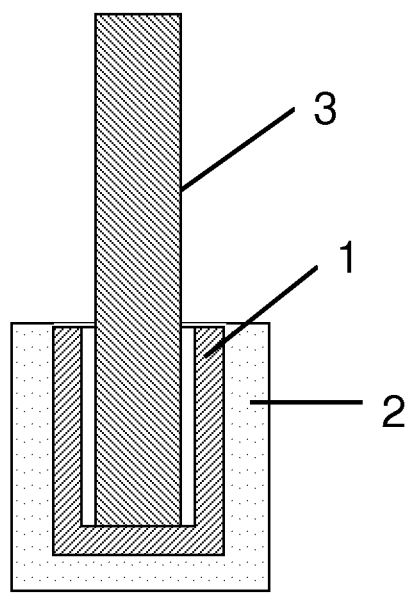
FIG. 2 shows a diagrammatic representation of a foamable adhesive tape prior to foaming in a PV module.

FIG. 2 shows the arrangement of a foamable adhesive tape 1, designed as an adhesive transfer tape, in a PV frame 2.

Adhesive tape 1 was produced by blending a solvent-containing acrylate adhesive, AC ester 1743 from National Starch, in a commercial paddle stirrer from Ika, with 5% by weight of Akzo Nobel type 51 DU 40 microballoons, and coating this blend, using a doctor blade, on to a release paper provided on both sides with a release. After drying at 23° C. for 240 minutes and at 70° C. for 15 minutes, the layer obtained on the release paper is a dry, unfoamed PSA layer which is homogeneously blended with unexpanded microballoons, having a thickness of 400 μm.

After converting to a width of 2.5 cm, the adhesive tape 1 was folded to a U-shape, so that the layer of composition is facing outwards (FIG. 2). This U-shaped adhesive tape was pressed into the frame 2, leaving a groove of 5.2 mm.

The frame 2 together with the adhesive tape 1 was sawn to the correct length, for the corners with a mitre joint of approximately 45°.

The laminate 3 was inserted without pressure into the frame 2 equipped with the adhesive tape 1 (FIG. 2). The individual frame elements were screwed together at the corners.

Figure 3:
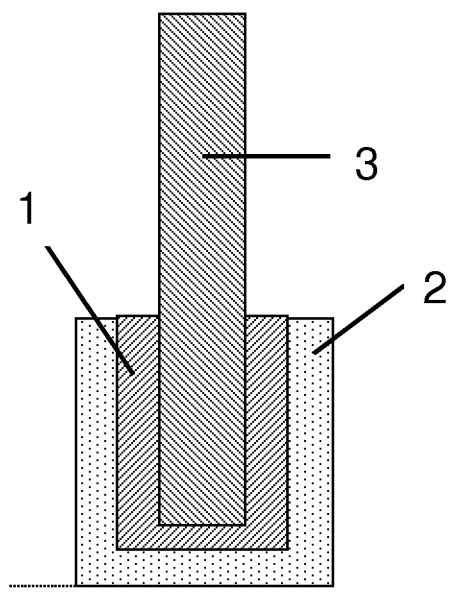
FIG. 3 shows the adhesive tape from FIG. 2 after foaming.

By contact heating of the frame at 200° C. for 30 seconds, the microballoons present in the adhesive tape were induced to foaming. The adhesive tape 1 subsequently filled out all of the remaining gaps between frame 2 and laminate 3 completely (FIG. 3).

The bond strength was determined after a storage time of 24 h at 23° C. and 50% rh, by clamping the top laminate edge and the enframed bottom laminate edge. The top laminate edge was pulled upwards with a speed of 300 mm/min. In the course of this procedure, the force needed in order to pull the laminate 3 from the frame 2 was ascertained. The tensile force ascertained in this way was approximately 84 N/cm.

Examples 2 to 12 show further adhesive tapes which were joined to laminate and frame, and foamed, in the same way as the adhesive tape described above. The further examples, however, contain different adhesives.

For all the examples, the tensile force required to draw the laminate out of the frame was ascertained, in each case as follows: following the adhesive bonding of laminate and frame, including foaming of the adhesive tape, and after a storage time of 24 h at 23° C. and 50% rh, the bond strength was measured, by clamping in the top laminate edge and the enframed bottom laminate edge. The top laminate edge was pulled upwards at a speed of 300 mm/min. In the course of this procedure, the force needed in order to draw the laminate 3 out of the frame 2 was ascertained.

Example 2

To produce a silicone adhesive tape 1, a solvent-containing silicone PSA, PSA 45559 from Wacker, was blended, in a commercial paddle stirring mechanism from Ika, with 5% by weight of microballoons of type 51 DU 40 from Akzo Nobel, and this blend was coated out, using a doctor blade, on to a release film provided on both sides with a fluorosilicone release. After drying at 23° C. for 20 minutes and at 120° C. for 15 minutes, the layer obtained on the release film is a dry, unfoamed silicone PSA layer which is homogenously blended with unexpanded microballoons and has a thickness of 200 μm. To obtain a layer thickness of 400 μm for the silicone adhesive tape 1, two of the 200 μm silicone adhesive transfer tapes are laminated to one another.

Contact heating of the frame at 200° C. was carried out for 30 seconds for the foaming of the microballoons.

The tensile force needed to extract the laminate from the frame was approximately 46 N/cm.

Example 3

To produce the silicone adhesive tape 1, a solvent-containing silicone PSA, PSA 45559 from Wacker, was blended, in a commercial paddle stirring mechanism from Ika, with 5% by weight of microballoons of type 51 DU 40 from Akzo Nobel, and this blend was coated out, using a doctor blade, on to a release film provided on both sides with a fluorosilicone release. After drying at 23° C. for 20 minutes and at 120° C. for 15 minutes, the layer obtained on the release film is a dry, unfoamed silicone PSA layer which is homogenously blended with unexpanded microballoons and has a thickness of 200 μm. To obtain a layer thickness of 400 μm for the silicone adhesive tape 1, two of the 200 μm silicone adhesive transfer tapes are laminated to one another. The silicone adhesive tape 1 is crosslinked with electron beams: 160 kV and 10 kGy.

Contact heating of the frame at 200° C. was carried out for 30 seconds for the foaming of the microballoons.

The tensile force needed to extract the laminate from the frame was approximately 49 N/cm.

Example 4

To produce the silicone adhesive tape 1, a solvent-containing silicone PSA, PSA 45559 from Wacker, was blended, in a commercial paddle stirring mechanism from Ika, with 5% by weight of microballoons of type 950 DU 80 and with 2% by weight of Perkadox L-50S-PS from Akzo Nobel, and this blend was coated out, using a doctor blade, on to a release film provided on both sides with a fluorosilicone release. After drying at 23° C. for 20 minutes, at 90° C. for 5 minutes and at 175° C. for 3 minutes, the layer obtained on the release film is a dry, unfoamed silicone PSA layer which is homogenously blended with unexpanded microballoons and has a thickness of 200 μm. To obtain a layer thickness of 400 μm for the silicone adhesive tape 1, two of the 200 μm silicone adhesive transfer tapes are laminated to one another.

Contact heating of the frame at 210° C. was carried out for 30 seconds for the foaming of the microballoons.

The tensile force needed to extract the laminate from the frame was approximately 47 N/cm.

Example 5

To produce the silicone adhesive tape 1, a solvent-containing silicone PSA, PSA 45559 from Wacker, was blended, in a commercial paddle stirring mechanism from Ika, with 5% by weight of microballoons of type 950 DU 80 and with 2% by weight of Perkadox L-50S-PS from Akzo Nobel, and this blend was coated out, using a doctor blade, on to a release film provided on both sides with a fluorosilicone release. After drying at 23° C. for 20 minutes, and at 120° C. for 15 minutes, the layer obtained on the release film is a dry, unfoamed silicone PSA layer which is homogenously blended with unexpanded microballoons and has a thickness of 200 μm. To obtain a layer thickness of 400 μm for the silicone adhesive tape 1, two of the 200 μm silicone adhesive transfer tapes are laminated to one another.

Contact heating of the frame at 210° C. was carried out for 3 minutes for the foaming of the microballoons.

The tensile force needed to extract the laminate from the frame was approximately 49 N/cm.

Example 6

To produce the silicone adhesive tape 1, a solvent-containing silicone PSA, DC 7657 from Dow Corning, was blended, in a commercial paddle stirring mechanism from Ika, with a) 5% by weight of microballoons of type 51 DU 40 from Akzo Nobel and b) 1% of SylOff 4000 from Dow Corning, and this blend was coated out, using a doctor blade, on to a release film provided on both sides with a fluorosilicone release. After drying at 23° C. for 20 minutes, and at 120° C. for 15 minutes, the layer obtained on the release film is a dry, unfoamed silicone PSA layer which is homogenously blended with unexpanded microballoons and has a thickness of 200 μm. To obtain a layer thickness of 400 μm for the silicone adhesive tape 1, two of the 200 μm silicone adhesive transfer tapes are laminated to one another.

Contact heating of the frame at 200° C. was carried out for 30 seconds for the foaming of the microballoons.

The tensile force needed to extract the laminate from the frame was approximately 39 N/cm.

Example 7

To produce a silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 51 DU 40 from Akzo Nobel, 0.7% by weight of water and 0.02% by weight of Formrez UL-28 from Momentive Performance Chemicals, and this blend was coated out, using a doctor blade, on to a release film provided on both sides with a silicone release. After drying at 23° C. for 20 minutes, and at 80° C. for 5 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 200° C. was carried out for 30 seconds for the foaming of the microballoons.

The tensile force needed to extract the laminate from the frame was approximately 33 N/cm.

Example 8

To produce the silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 950 DU 80 from Akzo Nobel, 40% by weight of SR 1000 from Momentive Performance Chemicals, 0.7% by weight of water, 0.02% by weight of Formrez UL-28 and 2% by weight of Perkadox L-50S-PS from Akzo Nobel, and this blend was coated out, using a doctor blade, on to a release film provided on both sides with a silicone release. After drying at 23° C. for 20 minutes, at 80° C. for 5 minutes and at 175° C. for 3 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 210° C. was carried out for 30 seconds for the foaming of the microballoons.

The tensile force needed to extract the laminate from the frame was approximately 44 N/cm.

Example 9

To produce the silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 950 DU 80 from Akzo Nobel, 40% by weight of SR 1000 from Momentive Performance Chemicals, 0.7% by weight of water, 0.02% by weight of Formrez UL-28 and 2% by weight of Perkadox L-50S-PS from Akzo Nobel, and this blend was coated out, using a doctor blade, on to a release film provided on both sides with a silicone release. After drying at 23° C. for 20 minutes and at 80° C. for 5 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 210° C. was carried out for 3 minutes for the foaming of the microballoons. In the course of this heating procedure, the MQ resin SR 1000 as well, and hence also the silylated PU adhesive, were crosslinked.

The tensile force needed to extract the laminate from the frame was approximately 41 N/cm.

Example 10

To produce the silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 51 DU 40 from Akzo Nobel, 40% by weight of Picco A 100 from Eastman Chemical Company, 0.7% by weight of water, 0.02% by weight of Formrez UL-28, and this blend was coated out, using a doctor blade, on to a release film provided on both sides with a silicone release. After drying at 23° C. for 20 minutes and at 80° C. for 5 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 210° C. was carried out for 30 seconds for the foaming of the microballoons.

The tensile force needed to extract the laminate from the frame was approximately 37 N/cm.

Example 11

To produce the silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 51 DU 40 from Akzo Nobel, 40% by weight of DT 110 from Dérivés Résiniques et Terpéniques, 0.7% by weight of water, 0.02% by weight of Formrez UL-28, and this blend was coated out, using a doctor blade, on to a release film provided on both sides with a silicone release. After drying at 23° C. for 20 minutes and at 80° C. for 5 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 210° C. was carried out for 30 seconds for the foaming of the microballoons.

The tensile force needed to extract the laminate from the frame was approximately 40 N/cm.

Example 12

To produce the silylated PU adhesive tape 1, a solvent-containing silylated PU PSA, SPUR+ 3.0 PSA from Momentive Performance Chemicals, was blended, in a commercial paddle stirring mechanism from Ika, with 5% by weight of microballoons of type 51 DU 40 from Akzo Nobel, 40% by weight of DT 135 from Dérivés Résiniques et Terpéniques, 0.7% by weight of water, 0.02% by weight of Formrez UL-28, and this blend was coated out, using a doctor blade, on to a release film provided on both sides with a silicone release. After drying at 23° C. for 20 minutes and at 80° C. for 5 minutes, the layer obtained on the release film is a dry, unfoamed silylated PU PSA layer which is homogenously blended with unexpanded microballoons and has a thickness of 200 μm. To obtain a layer thickness of 400 μm for the silylated PU adhesive tape 1, two of the 200 μm silylated PU adhesive transfer tapes are laminated to one another.

Contact heating of the frame at 210° C. was carried out for 30 seconds for the foaming of the microballoons.

The tensile force needed to extract the laminate from the frame was approximately 40 N/cm.

The invention claimed is:

1. A method for sealing the edges of a photovoltaic laminate and bonding said laminate in a frame, which comprises providing a frame having grooves, pressing an adhesive tape having at least one adhesive layer, at least one foamable polymer layer comprising a foaming agent, and a barrier layer, into said grooves to form adhesive grooves and inserting the edges of said laminate into said adhesive grooves, or applying said adhesive tape over the edges of said laminate and inserting the adhesive tape covered edges of said laminate into said grooves, and foaming said polymer layer to seal the edges of said laminate and bond said laminate in said grooves.

2. Method according to claim 1, wherein the foamable polymer layer comprising the foaming agent is a foamable adhesive polymer layer.

3. Method according to claim 1 wherein at least one adhesive layer is formed of poly(diorgano)siloxanes.

4. Method according to claim 1 wherein at least one adhesive layer comprises a moisture-crosslinking, silylated, pressure-sensitive polyurethane adhesive.

5. Method according to claim 1, wherein at least two adhesive layers are present, and the adhesive layers form a top and a bottom adhesive layer.

6. Method according to claim 1, wherein the foamable polymer layer comprising the foaming agent has, after foaming, a layer thickness in the range from about 100 μm to about 3000 μm.

7. Method according to claim 1, wherein the foamable polymer layer comprising the foaming agent is foamed by application of heat.

8. Method of claim 7 wherein the foamable polymer layer is heated to at least 100° C.

9. Method of claim 8 wherein the foamable polymer layer is heated to at least 150° C.

10. Method according to claim 1 wherein the foamable polymer layer comprising the foaming agent undergoes, as a result of the foaming, a volume increase of at least 30%.

11. Method according to claim 1 wherein the frame is produced by extrusion and the adhesive tape is introduced into the frame during the extrusion of the frame.

12. Method according to claim 11, wherein the adhesive tape together with the frame is separated to the desired length.

13. Method of claim 1, wherein the adhesive tape comprises a carrier formed of a barrier layer.

* * * * *